Aug. 18, 1959 — C. E. CREDE — 2,900,161
RESILIENT SUPPORT

Filed Jan. 29, 1954 — 6 Sheets-Sheet 1

Inventor,
Charles E. Crede,
by Dike, Thompson & Sanborn
Attys.

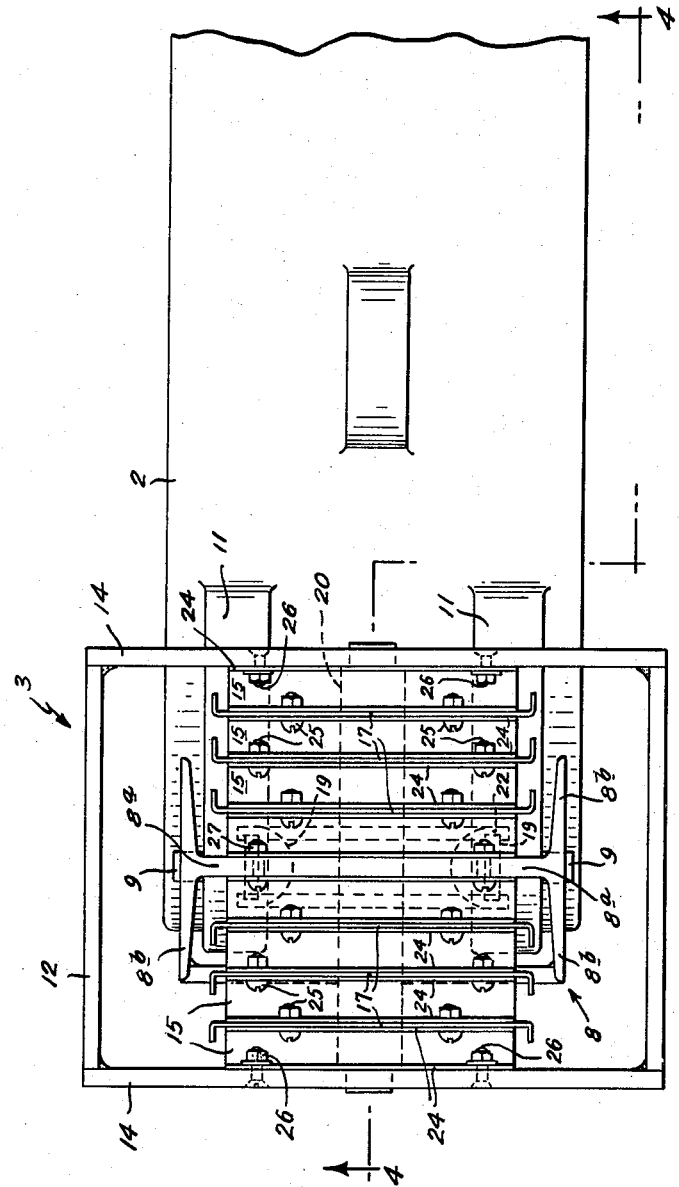

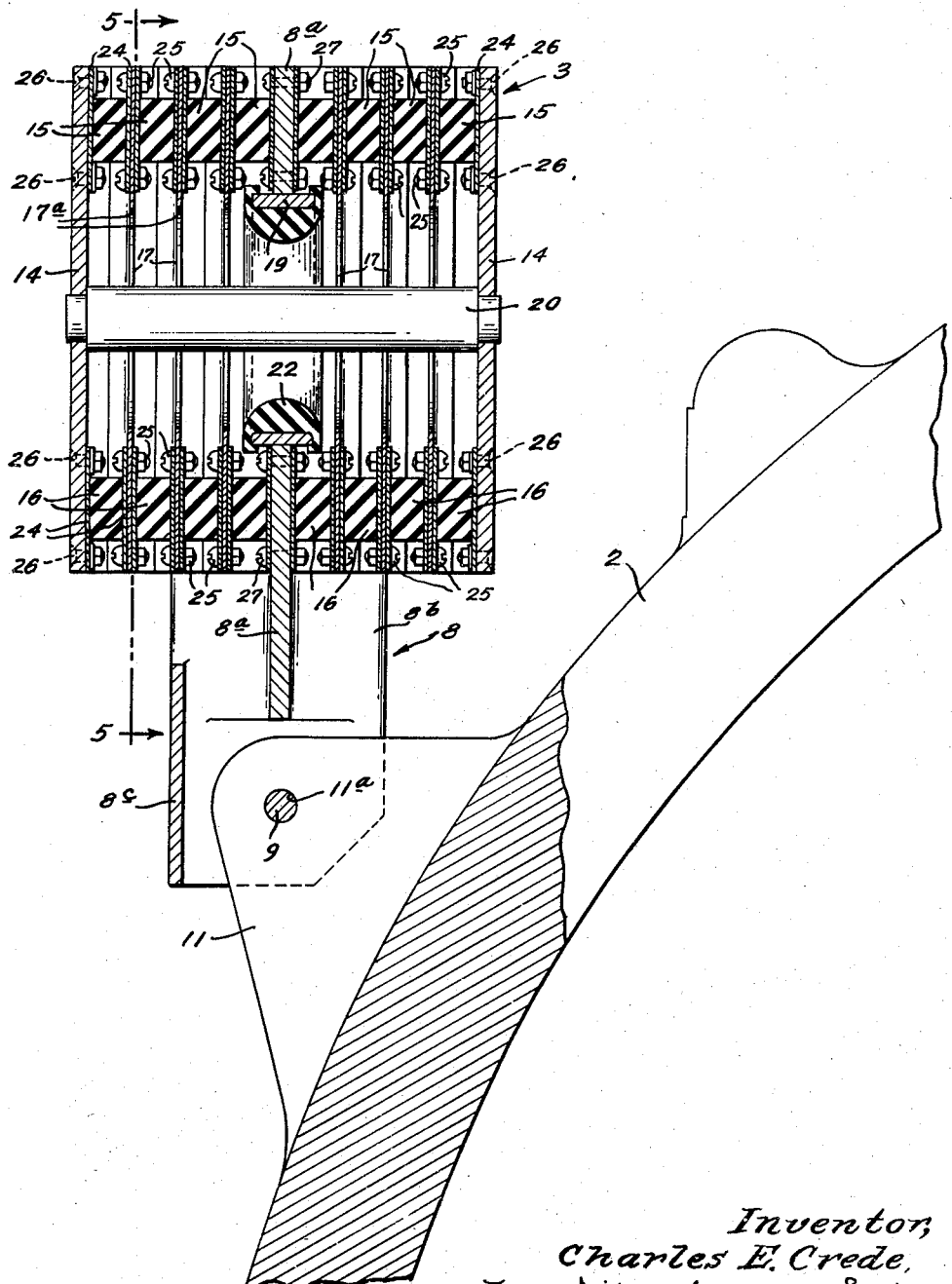

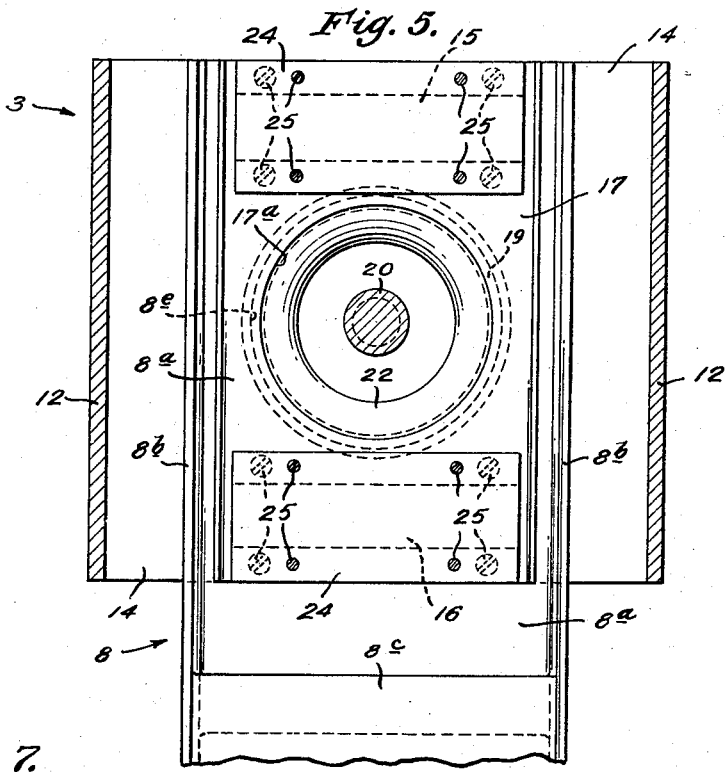
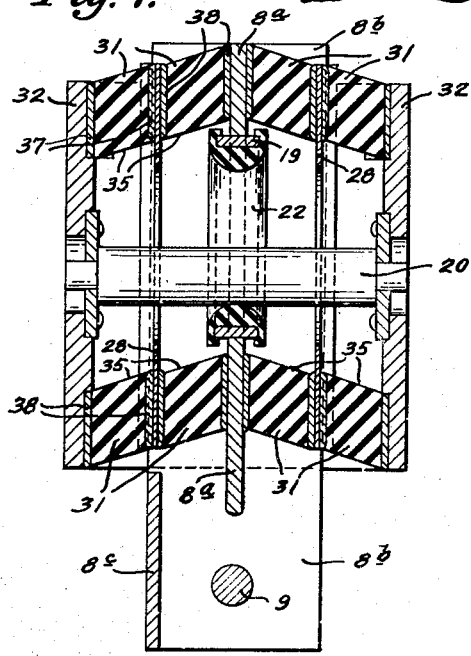
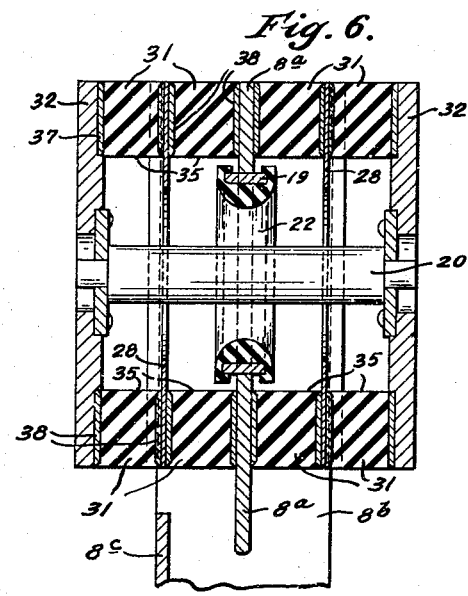

Aug. 18, 1959  C. E. CREDE  2,900,161
RESILIENT SUPPORT
Filed Jan. 29, 1954  6 Sheets-Sheet 5
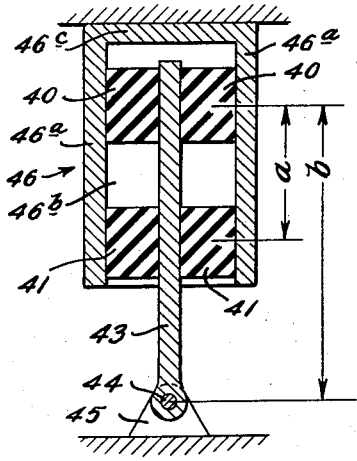
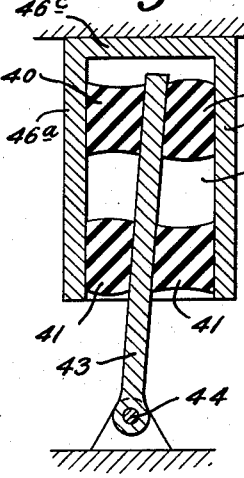
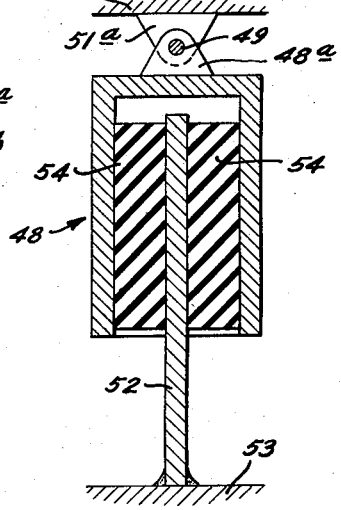
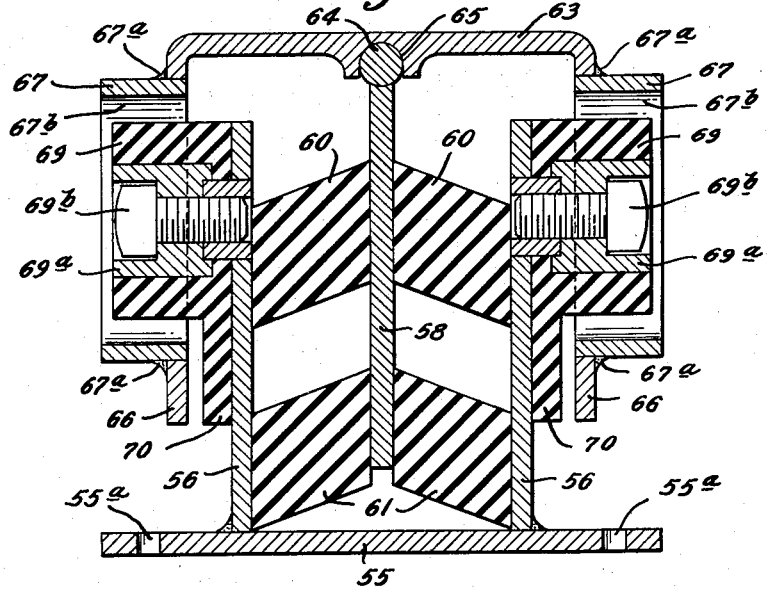
Inventor,
Charles E. Crede,
by Dike, Thompson & Sanborn
Attys.

Aug. 18, 1959 — C. E. CREDE — 2,900,161
RESILIENT SUPPORT
Filed Jan. 29, 1954 — 6 Sheets-Sheet 6

Inventor,
Charles E. Crede,
by Site, Thompson & Sanborn
Attys.

United States Patent Office 2,900,161
Patented Aug. 18, 1959

2,900,161

RESILIENT SUPPORT

Charles E. Crede, Winchester, Mass., assignor to Barry Controls Incorporated, a corporation of Massachusetts Application January 29, 1954, Serial No. 406,929

7 Claims. (Cl. 248—358)

This invention pertains to resilient supports for equipment or apparatus, and to means for attaining certain static and dynamic characteristics in such supports. A resilient support of the type constituting my invention has a particular application as a vibration isolator wherein the total weight of the mounted equipment or apparatus is supported by the isolator. Vibration isolation is obtained by controlling the natural frequency of the vibration isolator and the natural frequency of the isolator is determined by its stiffness. An isolator capable of isolating vibration of low frequency must have a lower natural frequency; i.e. a low stiffness and an ability to sustain a large static deflection. Means to control the stiffnesses in various directions is included within the scope of this invention.

One of the most important considerations in the design of a vibration isolator is the selection of a material for use as the resilient element. Natural and synthetic rubbers have many advantages for this application. They have relatively great energy storage capacity per unit of weight and they exhibit appreciable internal hysteresis. One of the principal disadvantages is that the moduli or stiffnesses in various directions are substantially different; i.e., rubber strained in compression exhibits a much greater stiffness than rubber strained in shear. The ratio of these two stiffnesses is substantially constant, and cannot be varied to an appreciable extent by changing the size or shape of the rubber element. This invention relates to an arrangement of resilient elements wherein the geometry of the arrangement compensates for the difference in shear and compression stiffnesses. This makes it possible to control the stiffnesses so that any desired ratio may be obtained including a condition of equal stiffnesses in all directions.

One of the objects of this invention is to provide a vibration isolator in which the stiffnesses of the isolator for various directions of motion may be controlled by proper geometrical arrangement of the load-carrying resilient elements.

A further object of this invention is to attain substantially equal stiffnesses for all directions of motion in a resilient support.

Another object of this invention is to provide a vibration isolator employing load-carrying resilient elements arranged to provide a relatively low natural frequency for all directions of motion.

Another object of this invention is to provide a vibration isolator comprising a plurality of resilient elements made from natural or synthetic rubber. The plurality of rubber elements constituting the vibration isolator may be identical; manufacturing costs thus may be maintained at a minimum by employing a single mold for forming the rubber elements.

Other objects and advantages of the invention will be apparent from the following detailed description and appended drawings wherein several embodiments of the invention are illustrated.

In the drawings:

Fig. 3 is an enlarged plan view of one of the supports illustrated in Figs. 1 and 2;

Fig. 4 is a section on line 4—4 of Fig. 3;

Fig. 5 is a section on line 5—5 of Fig. 4;

Fig. 6 is a vertical section similar to Fig. 4 showing another embodiment of the invention, the resilient elements of the support being shown with the configurations that they assume when loaded by the normal static load of the supported equipment;

Fig. 7 is a view similar to Fig. 6 with the static load removed from the resilient support, the resilient elements of the support being shown with the configurations that they assume in such unloaded position;

Fig. 8 is a vertical section similar to Fig. 4 showing another embodiment of the invention;

Fig. 9 is a view similar to Fig. 8 showing the load or supported equipment deflected laterally;

Fig. 10 is a vertical section similar to Figs. 4 and 8 showing another embodiment of the invention;

Fig. 11 is a vertical section similar to Fig. 4 showing a still further embodiment of the invention;

*The first embodiment*

Figure 2:
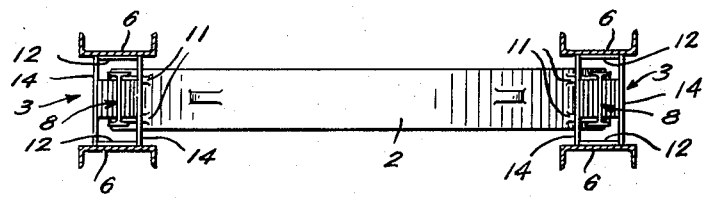
Fig. 2 is a section taken on the lines 2—2 of Fig. 1.
Figure 1:
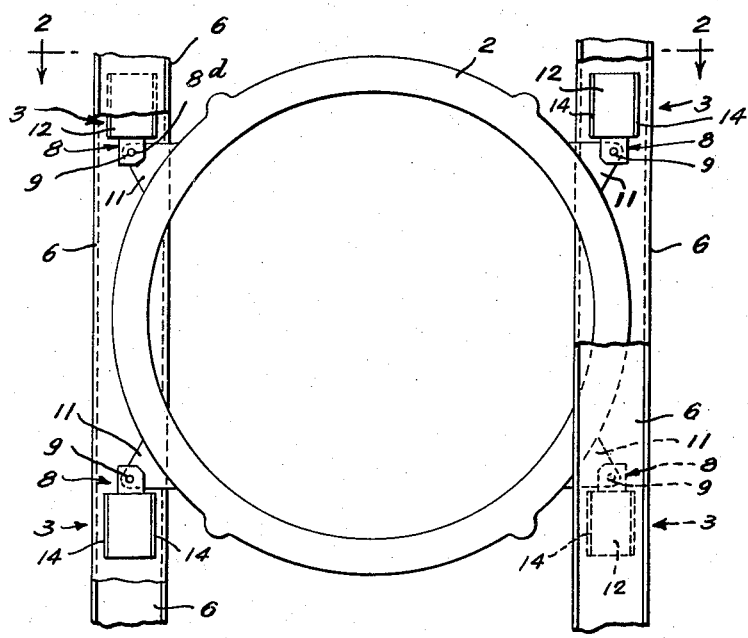
Fig. 1 is a side elevation view showing a typical application of one embodiment of resilient supports of the invention, portions of the mounting structure being broken away to more clearly illustrate the supports.

One application of the resilient supports or vibration isolators constituting this invention is to mount, in an airplane, equipment contained within the gimbal ring 2 illustrated in Figs. 1 and 2. The gimbal ring 2 is oriented in a substantially vertical plane and is supported by four similar isolators 3 located in the same vertical plane. Each of the isolators includes an outer box-like structure adapted to be secured rigidly by bolts or other suitable means (not shown) to frame members 6 of the airplane and an attachment member 8 which has a protruding portion adapted to be hingedly attached by a headed pin 9 or equivalent hinge means to the gimbal ring 2. The attachment to the gimbal ring 2 is at the spaced lugs 11 which protrude from its periphery, the protruding portions of the members 8 of the upper isolators extending downwardly from the box-like structures, whereas protruding portions of the members 8 of the lower isolators extend upwardly from the box-like structures.

The box-like structure which forms an outer housing for the isolators 3 illustrated in Figs. 1 to 5 comprises two spaced vertical walls 12 in planes substantially parallel with the plane of the gimbal ring 2, and two spaced vertical walls 14 extending substantially perpendicular to the first mentioned walls and arranged in vertical planes substantially perpendicular to the vertical planes of the walls 12 and of the gimbal ring 2. The ends of the box-like structure are open.

The member 8 is in the form of an I-beam extending vertically within the space between the walls of the box-like structure. Each member 8 comprises a central web 8a, flanges 8b and a cross piece 8c which extends between the flanges adjacent to the end of the member 8 at which the lugs 11 are attached. The protruding end of the web 8a is removed or shortened to accommodate the lugs 11 and the flanges 8b are provided with perforations 8d (Fig. 1) which rotatably receive the pin 9. The function of the cross piece 8c is to reinforce the end of the member 8 to compensate for the omission of the end of the web 8a from the protruding end of the I-beam 8.

Each lug 11 is provided with a perforation 11a (Fig. 4) which rotatably receives a pin 9. Each hinge pin 9 extends through the perforations 11a in a pair of lugs 11 of the gimbal ring 2 and the registering perforations 8d in the protruding ends of the spaced flanges 8b. The pin may be detachably secured in place by cotter pins or other suitable means (not shown).

The member 8 is attached to the box-like structure of the isolator 3 by means of a plurality of rubber members or blocks 15, 16, the metal stabilizing plates 17 and the metal facing plates 24 arranged as illustrated in Figs. 3 to 5 and as described below.

To limit the excursion of the mounted gimbal ring 2, the member 8 is provided with a central circular aperture 8e (Fig. 5) to which the ring 19 is welded. The pin 20 extends through the center of the ring 19 and is supported by the plates 14. An annular rubber grommet 22 is mounted on the ring 19. The grommet 22 engages the pin 20 upon excessive deflection of the resilient members of the isolator and this grommet thus provides a cushioned limiting device.

Spaced rectangular stabilizing members 17 extend throughout substantially the depth of the box-like structure substantially parallel to the walls 14 of the box-like structure and to the web 8a of the member 8. The members 17 are provided with perforations 17a (Fig. 5). A plurality of preferably identical rubber blocks 15, 16 are bonded or adhered to the rectangular facing plates 24. The facing plates 24 are higher than the rubber blocks and they are secured in abutting relationship with the stabilizing members 17 by bolts 25. The outer plates 24 are secured in abutting relationship to the walls 14 of the box-like structure by the bolts 26. The inner plates 24 are secured in abutting relationship to the web 8a by the bolts 27. Thus, one series of rubber blocks 15 is disposed adjacent to the upper edge of the box-like structure and a second series of rubber blocks 16 is disposed adjacent the lower edge of the box-like structure.

The load is applied from the lugs 11 to the web 8a by the pin 9. The deadweight load acts vertically and induces shear stress in the rubber blocks. Four of the rubber assemblies in parallel thus support the load, each assembly being a group of four parallel blocks disposed at one side of the web 8a. For example, the four blocks 15 at the upper left of the web 8a is one assembly and these four blocks are arranged in series. The four blocks 16 at the lower left of the web 8a is another assembly, etc.

The stabilizing members 17 are provided so that the thickness of each block may be limited to a relatively small dimension, preferably less than the vertical height of the load-carrying face. This insures that the rubber members are strained in shear and not in flexure. Flexure would tend to introduce undesirable tensile stress at the bonded interfaces.

The second embodiment

The embodiment shown in Figs. 6 and 7 is similar to that shown in Figs. 1 to 5 inclusive except that only one stabilizing member 28 is provided on each side of the web 8a and each assembly of load-carrying rubber blocks comprises only two members 31 arranged in series. The rubber blocks 31 are designed to have the configuration shown in Fig. 6 when deflected by the static or deadweight load of the mounted equipment. To achieve this configuration, the outline of the blocks when not subjected to a load is as illustrated in Fig. 7. Inasmuch as the spacing between the end plates 32 of the box-like structure of the isolator is fixed, the inclined faces 35 of the rubber members 31 partake of some compression in being deflected by the load from the configuration shown in Fig. 7 to that shown in Fig. 6. This intro- duces a compressive as well as a shear stress at the bonds 37 to the adhered attaching plates 38, thereby preventing the occurrence of a tensile stress arising at the interface with consequent danger of failure of the bond.

In this embodiment, the ends of the plates 38 project laterally beyond the ends of the blocks 31 and these projecting portions of the plates 38 are bolted to stabilizing members 28, the plates 32 and the web 8a to attach the assemblies between the plates 32 and the web 8a (these bolts are not shown).

The third and fourth embodiments

The third embodiment is illustrated in Figs. 8 and 9 and the fourth embodiment is illustrated in Fig. 10. Only four resilient blocks are employed in the embodiment of Figs. 8 and 9, only two resilient blocks are employed in Fig. 10 and no stabilizing members are employed in either the third or forth embodiments.

In the embodiment of Figs. 8 and 9 the box-like structure comprises two side walls 46a, two side walls 46b and a top wall 46c which is secured to either the airplane structure or the mounted equipment by any suitable means (not shown). The center tongue 43 which corresponds to the web 8a of the first and second embodiments is pivotally secured by the hinge pin 44 to a pair of spaced lugs 45 which are rigidly secured to either the airplane structure or the mounted equipment. The rubber blocks 40 and 41 are bonded or otherwise adhered to the tongue 43 and the walls 46a. Thus, the vertical or deadweight load is supported in this instance by the four rubber blocks 40, 41 acting in parallel.

A resilient element may be considered to consist of many small component parts, each of which is deformed when an external force is applied to the resilient element. This occurs as if an individual force were acting on each part. The resultant of these individual forces acts through the elastic center of the resilient element. If the resilient element is of a form having square or rectangular faces on all sides, as shown in Figs. 1 to 5 and 8 to 10 of the drawings, for example, the elastic center is at the geometric center of the bonded face of the resilient element. If the resilient element is irregular in shape, such as shown in Fig. 11, the elastic center can be found by analyzing the forces exerted by the component parts of the resilient element.

Referring to Fig. 8, the positions of the rubber blocks 40, 41 and the hinge pin 44 may be defined with reference to a plane extending through the elastic centers of rubber blocks 40 and normal to the plane through the longitudinal center line of the center tongue 43 and parallel with the axis of the hinge pin 44. The elastic centers of the blocks 41 are spaced a distance $a$ from the reference plane. The hinge pin 44 is spaced a distance $b$ from the reference plane. Rigorously, dimensions $a$ and $b$ should refer to the configurations of the support when carrying the deadweight load of the supported equipment. In most practical designs, however, a negligible error will be introduced by taking as $a$ and $b$ the dimensions of the unloaded support. As used in the annexed claims and in the ensuing equation, "distance $a$" and "distance $b$" are measured from the reference plane as described in this paragraph.

In the ensuing equation and in the annexed claims, the horizontal or compression stiffness of the resilient element, i.e. the rubber block 40 in Fig. 8, the assembly of two rubber blocks 31 in series in Fig. 7, or the assembly of four rubber blocks in series in Fig. 4, which is spaced the greatest distance from the hinge pin is designated by $kh_1$ and the horizontal or compression stiffness of the resilient element which is spaced the shortest distance from the hinge pin (for example, each of the two lower blocks 41) is designated by $kh_2$. In a similar manner, the vertical or shear stiffness of each of the former blocks (the blocks 40 in Fig. 8) is indicated by $kv_1$ and the vertical or shear stiffness of each of the two latter blocks (the blocks 41 in Fig. 8) is indicated by $kv_2$.

Inasmuch as the four blocks 40, 41 act in parallel when the tongue 43 is subjected to a vertical force, the overall vertical stiffness of the isolator is $2kv_1$ plus $2kv_2$. When a horizontal force acting in a direction normal to the plane of the paper is applied to the center tongue 43, the overall stiffness of the isolator is equal to the vertical stiffness as defined immediately above, namely $2kv_1$ plus $2kv_2$, because each of the blocks is in shear.

When a horizontal force acting in a direction parallel with the plane of the paper is applied to the center tongue 43 at the hinge pin 44, the tongue 43 rotates about the axis of the hinge pin 44 and assumes the position shown in Fig. 9. In this position, certain of the rubber blocks 40, 41 are compressed and others are elongated as shown in Fig. 9. The relatively high stiffness inherent in rubber strained in compression is thus modified by the action of the lever-like center tongue 43. The stiffness of the isolator when subjected to such a force depends upon the characteristics of the rubber blocks and their spacing with respect to the axis of the hinge. This stiffness is determined by considering a horizontal force F to be applied to the tongue 43 at the hinge pin 44 and taking a summation of vertical forces acting on tongue 43 together with a summation of moments about blocks 40:

$$kh_2d_2 + kh_1d_1 = F$$
$$akh_2d_2 = Fb$$

where $d_1$ and $d_2$ are the deflections of blocks 40 and 41, respectively. The two preceding equations are solved simultaneously for $d_2$ as follows:

$$d_2 = \frac{F}{kh_2}\left(\frac{b}{a}\right)$$

From the geometry of the embodiment shown in Figures 8 and 9, the following expression can be written defining the relation between the deflections $d_1$, $d_2$ of blocks 40, 41 and the deflection $d_F$ at the hinge pin 44:

$$d_F = d_1 + \frac{b}{a}(d_2 - d_1) = \frac{b}{a}d_2 + \left(1 - \frac{b}{a}\right)d_1$$

Substituting the above derived expression for $d_2$, the following expression is obtained for $d_F$:

$$d_F = F\left[\frac{1}{kh_2}\left(\frac{b}{a}\right)^2 + \frac{1}{kh_1}\left(1 - \frac{b}{a}\right)^2\right]$$

The horizontal stiffness in a plane parallel to the plane of the paper is then the applied force F divided by the resulting deflection $d_F$.

$$\frac{1}{\frac{1}{kh_2}\left(\frac{b}{a}\right)^2 + \frac{1}{kh_1}\left(1 - \frac{b}{a}\right)^2}$$

It is thus evident that the stiffness of the isolator in the directions of the three coordinate axes can be made equal by properly selecting the stiffness of the rubber blocks and by properly positioning them with respect to the axis of the hinge pin 44.

It is evident from the above discussion that the hinge pin 44 is essential for proper control of the stiffnesses of the isolator or support in various directions. If the hinge 44 in Figs. 8 and 9 were made rigid, the stiffness of the isolator when subjected to a horizontal force acting in a plane parallel to the plane of the paper would be $$2kh_1 + 2kh_2$$

It is not essential that the tongue-like member 43 be hinged, but only that relative angular motion between the tongue-like member 43 and the walls 46a of the outer box-like structure 46 be permitted. This may be accomplished as illustrated in Fig. 10 wherein the outer box-like structure 48 is hinged to a load-supporting member of the airplane structure or to the mounted equipment 51 by the hinge pin 49 which passes through apertures in the lugs 48a and 51a. The center tongue 52 is then secured rigidly to the other of the airplane structure or mounted equipment 53.

As illustrated in the first, second and third embodiments, resilient elements are spaced apart along the length of a center tongue member which is hinged at one end. The stiffness of the support in a direction normal to the tongue member is determined by the relative positions of the hinge and the resultant forces applied by the resilient elements. As shown in Fig. 9, angular displacement of the tongue member causes certain of the resilient elements to be compressed and others to be extended. The spacing between the rigid members 43 and 46a of Figs. 8 and 9 is changed relatively little in the region between the resilient elements 40, 41. Consequently, it makes little difference whether this region is open, as illustrated in Figs. 8 and 9, or filled with rubber as illustrated by the elongate rubber blocks 54 in Fig. 10. Substantially the same performance results from the embodiments of Figs. 8 and 10, provided the length of each resilient element 54 of Fig. 10 is sufficiently great along the length of the tongue member 52 so that the end portions thereof apply forces upon deformation similarly to the forces applied by the spaced blocks 40, 41 in Figs. 8 and 9.

The embodiments of Figs. 1 to 9 may have the hinge located on the box-like member instead of on the tongue member as illustrated in Fig. 10, the construction of Fig. 10 not being specific to an isolator provided with only two resilient members, one at each side of the tongue member. Conversely, the embodiment of Fig. 10 provided with only two resilient members may have the hinge on tongue member 52 rather than on the box-like member 48. Indeed, if desired, hinge members may be provided on both the tongue member and the box-like member in all embodiments illustrated in the drawings.

The fifth embodiment

In the embodiment illustrated in Fig. 11, the base 55 of the isolator is provided with upstanding, spaced apart walls 56. The center tongue 58 of the isolator extends in a vertical plane midway between the walls 56. Rubber blocks 60, 61, spaced apart vertically and arranged on opposite sides of the center tongue 58, are provided to carry the supported load, the rubber blocks being strained in shear. The upper part of the isolator is in the form of an inverted channel 63 hinged along its longitudinal horizontal center line to the center tongue 58 by the groove 65 which rotatably receives the pin 64, the pin being welded or otherwise secured to the upper end of the tongue 58.

Within annular apertures in the depending flanges 66 of the inverted channel 63, tubular members 67 are secured by welding 67a and their cylindrical interior surfaces 67b are arranged to engage the rubber snubbers 69. The snubbers 69 are attached rigidly to the outer faces of the spaced walls 56 by the cylindrical blocks 69a and the bolts 69b. Horizontal motion parallel with the plane of the paper is limited by the rubber pads 70 extending downwardly from the snubbers 69. The pads 70 engage the flanges 66 upon excessive horizontal movement.

This embodiment of the isolator is applied by attaching the base 55 to the suporting structure by bolts or screws which extend through the four apertures 55a and by attaching the mounted equipment to the top of the channel 63 by any suitable means (not shown). The isolator is shown in loaded condition.

The sixth embodiment

Figure 12:
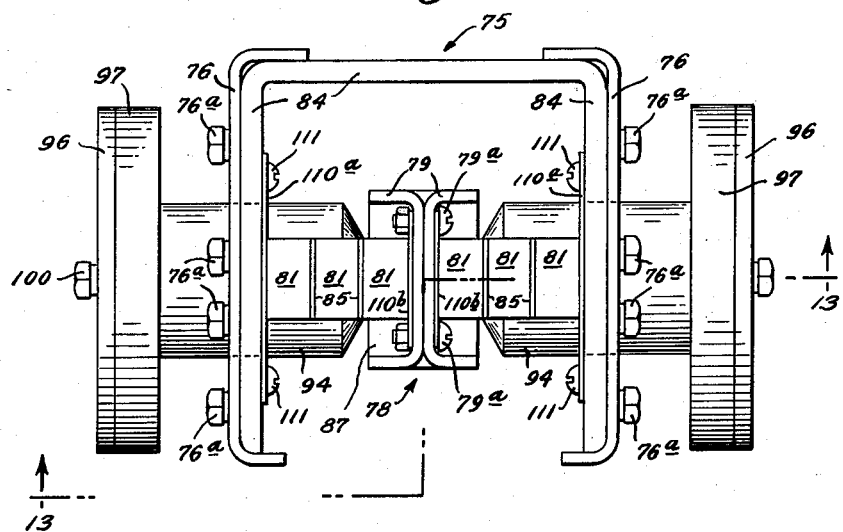
Fig. 12 is a plan view similar to Fig. 3 showing another embodiment of the invention.
Figure 14:
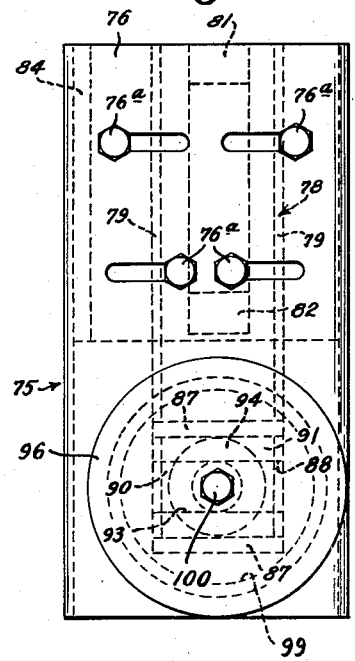
Fig. 14 is a side elevation looking from left to right at Fig. 13.
Figure 13:
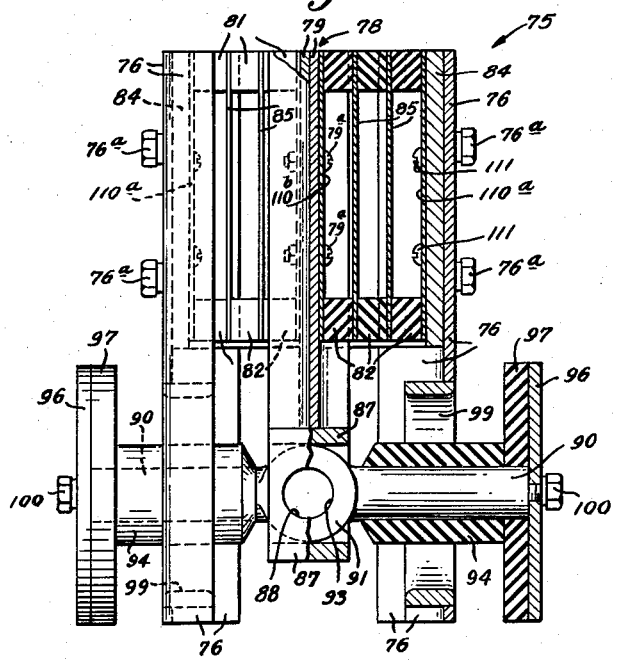
Fig. 13 is a front elevation with the right hand portion shown in vertical section taken on the line 13—13 of Fig. 12.

In the embodiment shown in Figs. 12 to 14, the isolator includes a three-sided box-like structure 75 rigidly mounted between the shallow, channel-shaped members 76 by means of the bolts 76a. The center tongue 78 is made up of two channel members 79 secured together back to back by the bolts 79a to effectively form an I-beam.

Resilient elements consisting of rubber blocks 81 are located adjacent to the upper edge of the box-like structure 75; other rubber blocks 82 are located at a distance below the top edge of the box-like structure. Each assembly of resilient elements consists of three rubber blocks 81, 82 interposed between the tongue 78 and the walls 84 of the box-like structure 75, with stabilizing plates 85 inserted between adjacent blocks for the purposes explained in connection with the embodiments of Figs. 1 to 7 inclusive.

The blocks 81 and 82 are bonded to the stabilizing plates 85 and also to the end plates 110a and 110b. The outer end plates 110a are secured to the walls 84 by bolts 111 and the inner end plates are secured to the center tongue 78 by the bolts 79a.

The center tongue 78 terminates at its lower end in a hollow rectangular block 87. The mounted equipment is adapted to be attached by a hinge pin (not shown) that is inserted through the horizontal bore or hole 88 in the block 87 and this pin is free to rotate freely in the bore 8, thereby providing the equivalent of the hinged load-transferring joint described with reference to preceding embodiments.

A rod 90 having an enlarged central part 91 extends through the block 87, the enlarged part 91 having an aperture 93 through which, after attachment, the hinge pin (not shown) extends. The rod 90 is encased in rubber sleeves 94 and carries steel washers 96 rigidly attached to its opposite ends by bolts 100. Rubber washers 97 abut the steel washers 96. The channel-shaped members 76 have tubular members 99 attached thereto. The members 99 cooperate with the rubber sleeves 94 and washers 97 to limit the excursion of the mounted equipment.

The rod 90 is free to rotate about the hinge pin so that the clearance between the rubber sleeves 94 and the tubular members 99 are self-adjusting to properly limit the vertical excursion of the mounted equipment.

The word "rubber" as used in this specification and the annexed claims includes both natural and synthetic rubber.

The rubber blocks of all embodiments may have a configuration similar to that shown in Fig. 7 before they are deflected by the static or deadweight load of the mounted equipment; such configuration, however, is not necessary in any of the embodiments.

Each set of rubber blocks acting in series at one side of the tongue member is the equivalent of a single block located in the same position. For example, the four upper left-hand blocks 15 of Figs. 1 to 5 inclusive are the equivalent of the single upper left-hand block of Figs. 8 and 9. Correspondingly, the four upper right-hand blocks 15 of Figs. 1 to 5 inclusive are the equivalent of the single upper right-hand blocks of Figs. 8 and 9, etc. The term "resilient element" as used in the annexed claims includes a single resilient element and also a plurality of resilient elements which act in series at one side of the tongue member. The stiffness equation given above and referred to in the claims thus is rigorously applicable to all embodiments shown in the drawings except the embodiment of Fig. 10 wherein only a single resilient element is used at each side of the tongue. A somewhat similar equation applies to the embodiment of Fig. 10 wherein the angular stiffness of the rubber blocks 54 is substituted for the angular stiffness of blocks 40, 41 spaced apart the distance $a$ in Figs. 8 and 9.

The preferred arrangement of rubber blocks to form the resilient elements depends upon the requirements of the particular application. If the application of the resilient support requires a relatively great static deflection, the embodiment shown in Figs. 1 to 5 is preferable because each block experiences only a fraction of the overall deflection. This tends to avoid the flexure stress that accompanies a great static deflection per block, with consequent tensile stress at certain bonded interfaces.

If the static deflection is moderate, each resilient element may comprise three rubber blocks, as shown in Figs. 12 to 14, or two rubber blocks as shown in Figs. 6 and 7. If the static deflection is small, single rubber blocks may be used, as shown in Figs. 8 to 11. It should be understood that multiple rubber blocks, as shown in Figs. 1 to 5, may also be used when the static deflection is small but this may not be economical because the manufacturing cost is relatively greater.

Each of the embodiments illustrated is substantially symmetrical with respect to a vertical plane extending through the center of the support. There are certain practical advantages derived from this symmetry. The support tends to become skewed in a horizontal direction when subjected to a vertical load unless symmetry is maintained. Furthermore, a symmetrical arrangement makes it possible to maintain the bonded interfaces under compression and also makes it convenient to provide devices to limit the excursion of the supported body.

The support is fully operative if the resilient elements are provided on only one side of the tongue member 8a in Figs. 1 to 5 for example, and the expressions for stiffness in the various directions remain valid. Accordingly, some of the claims cover such construction. Also, the provision of only one element on only one side of the tongue member provides a satisfactory isolator. Accordingly, some of the claims cover this latter construction.

The term "substantially equal" as used herein with reference to the stiffnesses of the support in the various directions includes variations in such stiffnesses of between about 15% to 20% caused by unavoidable engineering tolerances in the manufacture of the support. The term "resilient fulcrum" as used in the annexed claims refers to the portion of the rubber member or members about which the hinged member or lever turns. For example, in Fig. 9, when a left hand force is applied to the axis of the hinge 44 the lever 43 may be considered to turn on either blocks 40 or 41 depending upon the class of lever assumed. If the blocks 41 are assumed to be fulcrums then a force is transmitted by the lever action to the other blocks 40. If the blocks 40 are assumed to be fulcrums then a force is transmitted through the lever action to the blocks 41. In Fig. 10 the fulcrums and portions to which force is transmitted by the lever action comprise corresponding portions of the members 54. The term "resilient means" refers to a rubber member and members such as 54 in Fig. 10 and 40 and 41 in Fig. 9 and assemblies or an assembly of rubber members and plates as for example 15, 16 and 17 in Fig. 4.

While six embodiments of the invention are shown and described, it is to be understood that this disclosure is for the purpose of illustration and that various changes in shape, proportion and arrangement of parts and the substitution of equivalent elements may be made without departing from the spirit or scope of the invention as set forth in the appended claims.

I claim:

1. A resilient support for supporting a supported structure relative to a supporting structure, said support comprising a first rigid member and a second rigid member spaced from said first rigid member, said members having oppositely facing spaced surfaces having a first dimension in one direction and a second dimension in a second direction normal to said first direction, said rigid members being free to move with relation to each other a substantial distance in said first and second directions and toward each other in a third direction generally normal to said first and second directions, resilient means interposed between and extending for a substantial distance along said rigid members in said first direction, means attaching said resilient means to said rigid members for transmitting a load applied to one of said rigid members in said first and second directions through said resilient means to said other rigid member, hinge means spaced from said resilient means in said first direction and having an axis extending in said second direction for attaching one of said rigid members to one of said structures for swinging movement of said one rigid member about said axis and in said third direction toward and away from the other of said rigid members, said support having a first stiffness in said first direction which is determined by the stiffness of the resilient means in said first direction, a second stiffness in said second direction which is determined by the stiffness of the resilient means in said second direction, and a third stiffness in said third direction, said hinged rigid member forming a lever arm, a portion of the resilient means forming a resilient fulcrum for said lever arm when a force is applied to the axis of said hinge means in said third direction, whereby force is transmitted through said lever arm to another portion of said resilient means spaced a different distance from said hinge means in said first direction than said fulcrum, the stiffness of the support in said third direction being a function of the ratio of the distance in said first direction between the hinge means and said other portion and the distance in said first direction between said other portion and the fulcrum, said resilient means including a first resilient element spaced a predetermined distance from said hinge means in said first direction and a second resilient element separate from said first resilient element and spaced a predetermined distance from said hinge means and from said first resilient element in said first direction.

2. A resilient support for supporting a supported structure relative to a supporting structure, said support comprising a first rigid member having a pair of spaced walls and a second rigid member interposed between and spaced from said walls, each of said walls and said second rigid member having oppositely facing spaced surfaces having a first dimension in one direction and a second dimension in a second direction normal to said first direction, said rigid members being free to move with relation to each other a substantial distance in said first and second directions and toward each other in a third direction generally normal to said first and second directions, first resilient means interposed between one of said walls and said second rigid member and extending for a substantial distance along said wall and second rigid member in said first direction, second resilient means interposed between the other of said walls and said second rigid member in a position generally opposite from said first resilient means and extending for a substantial distance along said other wall and said second rigid member, means attaching said first resilient means to said one wall and said second rigid member and said second resilient means to said other wall and said second rigid member for transmitting a load applied to one of said rigid members in said first and second directions through said first and second resilient means to said other rigid member, hinge means spaced from said resilient means in said first direction and having an axis extending in said second direction for attaching one of said rigid members to one of said structures for swinging movement of said one rigid member about said axis and in said third direction, said support having a first stiffness in said first direction which is determined by the stiffness of said resilient means in said first direction, a second stiffness in said direction which is determined by the stiffness of said resilient means in said second direction, and a third stiffness in said third direction, said hinged rigid member forming a lever arm, a portion of said resilient means forming a resilient fulcrum for said lever arm when a force is applied to the axis of said hinge means in said third direction, whereby force is transmitted through said lever arm to another portion of said resilient means spaced a different distance from said hinge means in said first direction than said fulcrum, the stiffness of the support in said third direction being a function of the ratio of the distance in said first direction between the hinge means and said other portion and the distance in said first direction between said other portion and the fulcrum.

3. A support according to claim 2 wherein said first resilient means comprising a first resilient element spaced a predetermined distance from said hinge means in said first direction and a second resilient element spaced from and intermediate said first resilient element and said hinge means, said second resilient means comprising a third resilient element located in a position generally opposite from said first resilient element and a fourth resilient element located in a position generally opposite from said second resilient element.

4. A resilient support for supporting a supported structure relative to a supporting structure, said support comprising a first rigid member and a second rigid member spaced from said first rigid member, said members having oppositely facing spaced surfaces having a first dimension in one direction and a second dimension in a second direction normal to said first direction, said rigid members being free to move with relation to each other a substantial distance in said first and second directions and toward each other in a third direction generally normal to said first and second directions, hinge means having an axis extending generally in said second direction for attaching one of said rigid members to one of said structures for swinging movement of said one rigid member about said axis and in said third direction toward and away from the other rigid member, first resilient means interposed between said rigid members and spaced along said one rigid member in said first direction from said hinge means, and second resilient means interposed between said rigid members, said second resilient means being separate from said first resilient means and intermediate said hinge means and said first resilient means, and means attaching each of said resilient means to said rigid members for transmitting a load applied to one of said rigid members in said first and second directions through said resilient means to said other rigid member, the stiffness of the support in said third direction being a function of the ratio of the distance in said first direction between the hinge means and said first resilient means and the distance in said first direction between said first resilient means and said second resilient means.

5. A resilient support according to claim 4, said first resilient means comprising plate means located between said rigid members, a first resilient member interposed between and attached to one of said rigid members and said plate means, and a second resilient member interposed between and attached to said plate means and the other of said rigid members, said second resilient means comprising second plate means, a third resilient member interposed between and attached to said one rigid member and said second plate means and a fourth resilient member interposed between and attached to said second plate means and said other rigid member.

6. A resilient support for supporting a supported structure relative to a supporting structure, said support comprising a first rigid member having a pair of spaced walls and a second rigid member interposed between and spaced from said walls, each of said walls and said second rigid member having oppositely facing spaced surfaces having a first dimension in one direction and a second dimension in a second direction normal to said first direction, said rigid members being free to move with relation to each other a substantial distance in said first and second directions and toward each other in a third direction generally normal to said first and second directions, hinge means having an axis extending generally in said second direction for attaching one of said rigid members to one of said structures for swinging movement of said one rigid member about said axis and in said third direction, a first resilient element interposed between one of said walls and said second rigid member and spaced in said first direction from said hinge means, a second resilient element interposed between said one wall and said second rigid member, said second resilient element being intermediate said hinge means and said first resilient element, a third resilient element interposed between said other wall and said second rigid member in a position generally opposite from said first resilient element, a fourth resilient element interposed between said other wall and said second rigid member in a position generally opposite from said second resilient element, said fourth resilient element being intermediate said hinge means and said third resilient element and means attaching each of said first and second resilient elements to said one wall and said second rigid member and each of said third and fourth resilient elements to said other wall and said second rigid member for transmitting a load applied to one of said rigid members in said first and second directions through said resilient elements to said other rigid member, the stiffness of the support in said third direction being a function of the ratio of the distance in said first direction between the hinge means and said first resilient element and the distance in said first direction between said first resilient element and said second resilient element.

7. A support according to claim 1, said distances having a ratio at which the stiffness of said support in said third direction is substantially equal to the stiffnesses of said support in said first and second directions.

References Cited in the file of this patent

UNITED STATES PATENTS

| | | |
|---|---|---|
| 2,260,029 | Hull | Oct. 21, 1941 |
| 2,260,978 | Klein et al. | Oct. 29, 1941 |
| 2,318,257 | Peterman | May 4, 1943 |
| 2,460,596 | Roche | Feb. 1, 1949 |
| 2,650,548 | Dean | Sept. 1, 1953 |

FOREIGN PATENTS

| | | |
|---|---|---|
| 674,319 | Germany | Apr. 13, 1939 |

UNITED STATES PATENT OFFICE

CERTIFICATE OF CORRECTION

Patent No. 2,900,161                      August 18, 1959

Charles E. Crede

It is hereby certified that error appears in the printed specification of the above numbered patent requiring correction and that the said Letters Patent should read as corrected below.

Column 9, line 66, after "said" insert -- second --.

Signed and sealed this 26th day of April 1960.

(SEAL)
Attest:

KARL H. AXLINE
Attesting Officer

ROBERT C. WATSON
Commissioner of Patents